United States Patent
Palavalli et al.

(10) Patent No.: US 11,722,356 B2
(45) Date of Patent: Aug. 8, 2023

(54) ENABLING INTEGRATION OF SOLUTIONS WITH SOFTWARE-DEFINED NETWORKING PLATFORM

(71) Applicant: VMware, Inc., Palo Alto, CA (US)

(72) Inventors: Amarnath Palavalli, Cupertino, CA (US); Rajiv Mordani, Palo Alto, CA (US); Josh Dorr, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/738,341

(22) Filed: Jan. 9, 2020

(65) Prior Publication Data

US 2021/0218617 A1    Jul. 15, 2021

(51) Int. Cl.
*H04L 41/0213* (2022.01)
*H04L 41/0893* (2022.01)
*H04L 9/40* (2022.01)
*H04L 67/10* (2022.01)
*H04L 41/046* (2022.01)

(52) U.S. Cl.
CPC ........ *H04L 41/0213* (2013.01); *H04L 41/046* (2013.01); *H04L 41/0893* (2013.01); *H04L 63/10* (2013.01); *H04L 63/20* (2013.01); *H04L 67/10* (2013.01)

(58) Field of Classification Search
CPC .............. H04L 41/0213; H04L 41/046; H04L 41/0893; H04L 63/10; H04L 63/20; H04L 67/10
See application file for complete search history.

(56) References Cited

U.S. PATENT DOCUMENTS

| | | | |
|---|---|---|---|
| 10,289,457 B1 * | 5/2019 | Slawomir | G06F 9/54 |
| 10,623,390 B1 * | 4/2020 | Rosenhouse | H04L 67/10 |
| 11,310,057 B2 * | 4/2022 | Chen | H04L 67/10 |
| 2002/0173984 A1 * | 11/2002 | Robertson | H04L 67/34 709/220 |
| 2007/0153814 A1 * | 7/2007 | Canning | H04L 63/10 370/401 |
| 2016/0026495 A1 * | 1/2016 | Upadrasta | G06F 9/466 718/101 |
| 2016/0170476 A1 * | 6/2016 | Fu | G06F 11/3447 713/310 |

(Continued)

*Primary Examiner* — William G Trost, IV
*Assistant Examiner* — Abdelbasst Talioua
(74) *Attorney, Agent, or Firm* — Dinsmore & Shohl LLP

(57) ABSTRACT

Certain embodiments described herein are directed to a method of receiving information associated with a service provided by a management plane for managing a remote network. The method, in one example, includes registering, at an adapter container, with a data store or an entity within a service instance of a service deployment associated with a service within a software-defined networking environment associated with the remote network, wherein the service is provided for managing a remote network, and wherein registering with the data store or the entity causes the data store or the entity to send information associated with the service instance to the adapter when information is available. The method also includes receiving, at the adapter container, information from the data store or the entity. The method also includes transforming the information from a first format to a second format. The method also includes transmitting the information to an endpoint.

22 Claims, 5 Drawing Sheets

(56) References Cited

U.S. PATENT DOCUMENTS

| | | | |
|---|---|---|---|
| 2016/0205106 A1* | 7/2016 | Yacoub | H04W 12/041 |
| | | | 726/28 |
| 2016/0308861 A1* | 10/2016 | Ameling | H04L 63/0876 |
| 2017/0060557 A1* | 3/2017 | Bendelac | G06F 8/61 |
| 2017/0214550 A1* | 7/2017 | Kumar | H04L 67/51 |
| 2019/0004865 A1* | 1/2019 | Ivanov | G06F 9/44536 |
| 2019/0050272 A1* | 2/2019 | Liu | G06F 9/45558 |
| 2019/0102206 A1* | 4/2019 | Fichtenholtz | G06F 9/5027 |
| 2019/0102764 A1* | 4/2019 | Pattarawuttiwong | |
| | | | G07G 1/0009 |
| 2019/0220529 A1* | 7/2019 | Eberlein | H04L 67/10 |
| 2019/0272205 A1* | 9/2019 | Jiang | G06F 9/547 |
| 2019/0273746 A1* | 9/2019 | Coffing | G06Q 20/40 |
| 2019/0294779 A1* | 9/2019 | Suneja | G06F 9/45545 |
| 2020/0112487 A1* | 4/2020 | Inamdar | H04L 67/56 |
| 2020/0133789 A1* | 4/2020 | Natanzon | G06F 16/128 |
| 2020/0177549 A1* | 6/2020 | Barton | H04L 41/40 |
| 2020/0220848 A1* | 7/2020 | Patwardhan | H04L 9/083 |
| 2020/0236108 A1* | 7/2020 | Mital | G06F 21/606 |
| 2020/0264939 A1* | 8/2020 | Liu | H04L 41/5025 |
| 2020/0329114 A1* | 10/2020 | Bahl | G06N 3/006 |
| 2020/0356397 A1* | 11/2020 | Kumatagi | H04L 47/22 |
| 2020/0394049 A1* | 12/2020 | Eder | G06T 1/20 |
| 2021/0006569 A1* | 1/2021 | Uriel | H04L 43/20 |
| 2021/0019194 A1* | 1/2021 | Bahl | G06F 9/5072 |
| 2021/0048995 A1* | 2/2021 | Myers | G06F 11/1451 |
| 2021/0133000 A1* | 5/2021 | Okman | G06F 9/545 |
| 2021/0144013 A1* | 5/2021 | Chen | H04L 9/0894 |

\* cited by examiner

ENABLING INTEGRATION OF SOLUTIONS WITH SOFTWARE-DEFINED NETWORKING PLATFORM

BACKGROUND

Software-defined networking (SDN) offers many advantages over traditional computer networks. Traditional computer networks were designed with static architectures built around fixed physical links that interconnect networking equipment. Traditional networks can be difficult to troubleshoot and configure due to the many different pieces of networking gear that can be involved, such as switches, routers, and firewalls. Software-defined networking decouples the control plane from the data plane. As a result, network intelligence resides in controllers that are responsible for packet forwarding decisions. This makes reconfiguration and troubleshooting much easier and straightforward than with the traditional model.

Further, without the constraints of physical network divisions, a network can be virtually divided into many smaller segments, called microsegments. Microsegmentation can allow for creation of segments for particular purposes, thereby logically isolating endpoint workloads that do not need to communicate with one another thereby enhancing computer security. To enable microsegmentation, firewalling functions can be distributed throughout the network.

Software defined networks (SDNs) are typically managed by a management plane through the use of a network appliance deployed on the local network. This network appliance can provide, e.g., via a web interface, information about the network status and receive user commands to configure or reconfigure the network. However, a network appliance that is deployed on the network has many drawbacks in terms of scalability, upgradability, and flexibility. To address these drawbacks, in certain cases, the management plane is hosted by a "cloud" platform, where the customer is provided the management plane as a service under a utility computing model. As such, the customer need not be aware of the underlying computer hardware to implement the management functions, and the management plane can be upgraded and scaled as desired on behalf of the customer.

The management plane may include a plurality of different components or services that collectively allow for remotely managing the network. In certain cases, third party solutions may be utilized by administrators to supplement the services of the management plane and better manage the network. For example, a third party solution may be a monitoring solution that is utilized to provide insight and analytics around the operations and security of the network. To provide such insight and analytics, the monitoring solution will require access to information relating to the managed network, including information related to the latest configurations, rules, policies, operations, etc., associated with the network. In certain cases, third party solutions are able to obtain such information by polling the various services provided by the management plane through application programming interfaces (APIs) that are exposed by the services through an API gateway.

For example, a third party monitoring solution may be configured to frequently poll a policy service provided by the management plane to obtain information about the latest changes and updates to the policies used in managing the network. However, having a number of third party solutions frequently poll services of the management plane, such as the policy service, through an API gateway places a sizable load on the API gateway as well as the computing environment that executes the management plane. Other drawbacks of third party solutions polling services of a management plane on a regular basis are described herein in more detail.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various examples of a mechanism for allowing a third party solution to integrate with a management plane executed in a computing environment for managing a remote network. It should be noted that though certain examples are described with respect to integrating a third party solution, the aspects herein can be used to integrate any suitable type of component or service with a management plane. The management plane may provide multiple services, where each service may be deployed multiple times, resulting in multiple service deployments in a multi-tenant platform, such that each service deployment can serve a different tenant. Each service deployment may have one or more service instances, each service instance executing as an instance of the service. In certain aspects, each service instance is implemented in the form of a pod that includes multiple containers, including a main container and at least one sidecar container, which is responsible for supporting the main container. The embodiments described herein relate to enabling a third party solution to integrate an additional sidecar container, referred to as an adapter, into a service instance of a tenant's service deployment. The adapter can be configured to obtain information relating to the updates and changes being made by the main container relating to the corresponding service. In certain embodiments, the adapter is configured to receive push notifications from a data store or a container within the pod (e.g., the main container) relating to any changes and updates. In some other embodiments, in addition to or instead of receiving push notifications, the adapter is configured to poll the main container such as by polling the main container's API(s) directly or through an API gateway.

Figure 1:
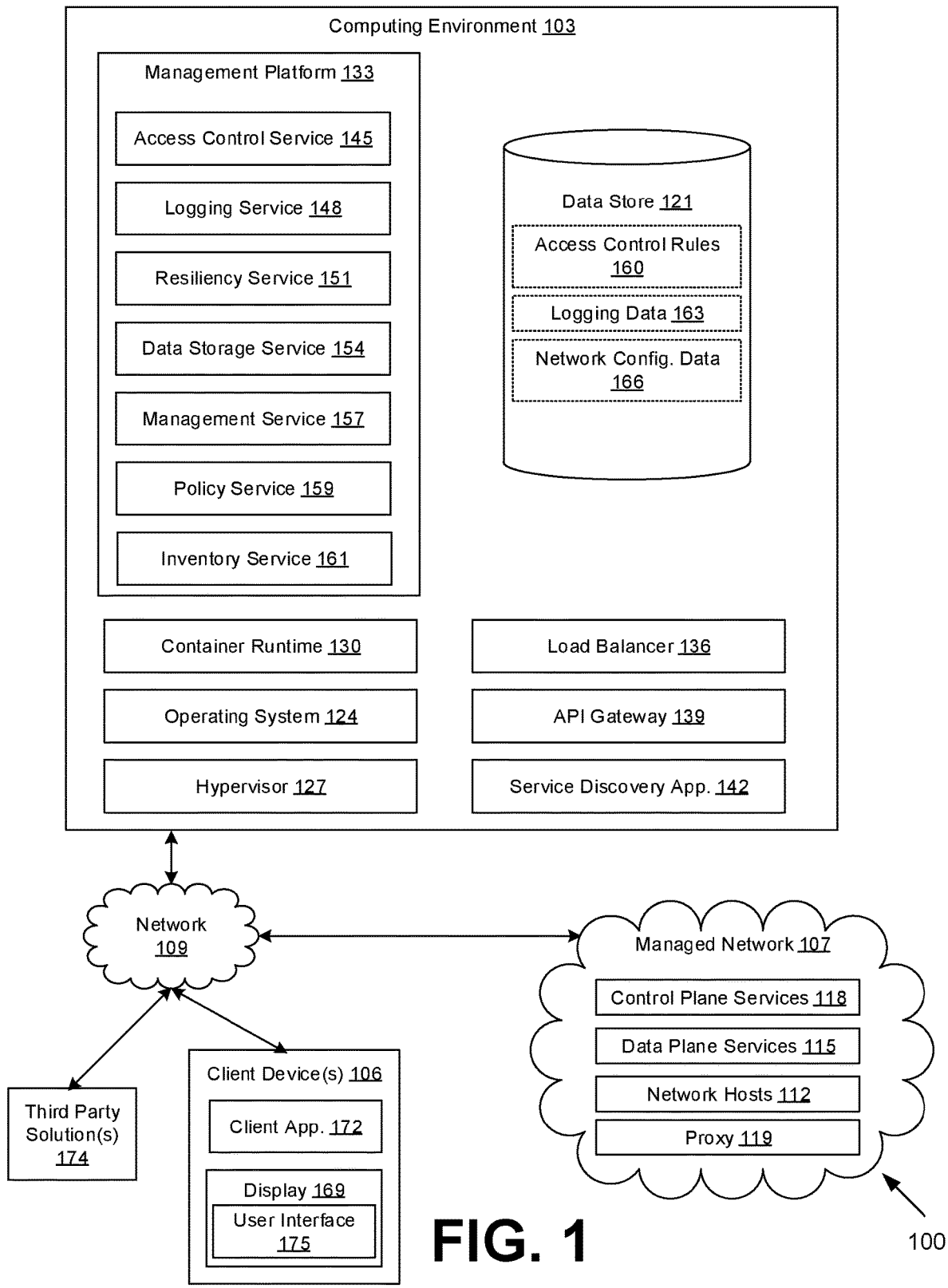
FIG. 1 is a drawing of a networked environment according to various examples of the disclosure.

With reference to FIG. 1, shown is a networked environment 100 according to various examples. The networked environment 100 includes a computing environment 103, one or more client devices 106, one or more third party solutions 174, and a managed network 107 in communication by way of network 109. The managed network 107 and the network 109 can include, for example, wide area networks (WANs), local area networks (LANs), wired networks, wireless networks, other suitable networks, or any combination of two or more networks. For example, the managed network 107 and network 109 can include satellite networks, cable networks, Ethernet networks, and other types of networks. The network 109 can include the public Internet.

The managed network 107 corresponds to a network of an organization or enterprise. The managed network 107 implements software-defined networking such that the control plane is decoupled from the data plane. Microsegmentation is the creation of many small virtual segments of the managed network 107 for specific purposes, primarily to make the internal network more secure against lateral attacks from malicious, rogue, or compromised workloads within the network. The managed network 107 can include network hosts 112, data plane services 115, and control plane services 118. The network hosts 112 can correspond to workstations, client devices, server devices, network appliances, and/or other components connected to the managed network 107. The data plane services 115 are responsible for forwarding data packets on the managed network 107. The control plane services 118 are responsible for configuring forwarding devices (e.g., edge virtual switches on hosts 112) on the managed network 107. In certain embodiments, the control plane services 118 provide a set of one or more APIs to provide information and insight, about the runtime status of user-defined configurations, to client devices 106 as well as third party solutions 174. In some implementations, the managed network 107 can include a proxy 119 to facilitate communication with the computing environment 103 using a network tunnel.

The computing environment 103 can be a computing environment that is operated by an enterprise, such as a business or other organization, which can be separate from the organization operating the managed network 107. To this end, the computing environment 103 can be located remotely from the managed network 107. The computing environment 103 can include, for example, a server computer, a network device, or any other system providing computing capabilities. Alternatively, the computing environment 103 can employ multiple computing devices that can be arranged, for example, in one or more server banks, computer banks, or other arrangements. The computing devices can be located in a single installation or can be distributed among many different geographical locations. For example, the computing environment 103 can include multiple computing devices that together form a hosted computing resource, a grid computing resource, or any other distributed computing arrangement.

In some cases, the computing environment 103 can operate as at least a portion of an elastic computing resource where the allotted capacity of processing, network, storage, or other computing-related resources can vary over time. The computing environment 103 can also include or be operated as one or more virtualized computer instances. Generally, the computing environment 103 can be operated in accordance with particular security protocols such that it is considered a trusted computing environment.

Various applications and/or other functionality can be executed in the computing environment 103. The data store 121 can be representative of a plurality of data stores as can be appreciated. The data stored in the data store 121, for example, is associated with the operation of the various applications and/or functional entities described below.

The components executed on the computing environment 103, for example, may include an operating system 124, a hypervisor 127, a container runtime 130, a management platform 133 (also referred to as the management plane), a load balancer 136, an API gateway 139, a service discovery application 142, and other applications, services, processes, systems, engines, or functionality not discussed in detail herein. The operating system 124 can correspond to commercially available operating systems such as MICROSOFT WINDOWS, LINUX, and so on, and can be running directly on the underlying hardware or as a virtual machine instance managed by a hypervisor 127.

Note that the hypervisor architecture may vary. In some embodiments, hypervisor 127 can be installed as system level software directly on a computing device's hardware (often referred to as "bare metal" installation). Alternatively, hypervisor 127 may conceptually run "on top of" operating system 124. In some implementations, hypervisor 127 may comprise system level software as well as a "Domain 0" or "Root Partition" virtual machine, which is a privileged machine that has access to the physical hardware resources of a corresponding computing device.

The container runtime 130 is executed to manage the execution of the management platform 133 in a container under the operating system 124. For example, the container runtime 130 can manage deployment and scaling of the management platform 133 so that the computing resources allocated to the management platform 133 can be increased or decreased in response to demand. A commercially available example of a container runtime 130 is DOCKER.

The load balancer 136 is executed to receive requests directed to the management platform 133 and direct the requests to one or more instances of the management platform 133. This can balance out the load experienced by any one of the instances of the management platform 133, thereby evening out the performance across the different instances so that any one instance does not experience overload conditions.

The API gateway 139 is executed to receive commands and queries from client devices 106 and third party solutions 174 over the network 109 using an API and to present those commands and queries to the management platform 133. The API gateway 139 can also format operational status data from the management platform 133 and obtain results of commands and queries and return the status and result data to the client device 106 as well as the third party solutions 174 over the network 109.

The service discovery application 142 is executed to automatically detect services on the managed network 107. The service discovery application 142 uses a service discovery protocol to help accomplish service discovery. Through the use of service discovery, the need for manual configuration by users is reduced.

The management platform 133 is executed in order to manage the managed network 107. Unlike conventional management planes that are deployed on appliances in the managed network 107, the management platform 133 is deployed in the hosted environment of the computing environment 103, which is located remotely from the managed network 107 over the network 109, which can include the public Internet. The management platform 133 can be containerized and managed itself by the container runtime 130. Thus, multiple instances of the management platform 133 can be created in order to scale computing resources allocated to the management platform 133. Such instances can be executed on different virtual machine instances and executed on different underlying computing hardware.

The management platform 133 interacts with administrative users at client devices 106 in order to allow the users to issue management commands and queries that result in a configuration or reconfiguration of the managed network 107. Also, the management platform 133 can allow the users to obtain operational status information from the managed network 107.

The management platform 133 can include or provide a plurality of different services such as an access control service 145, a logging service 148, a resiliency service 151, a data storage service 154, a management service 157, a policy service 159, an inventory service 161, and/or other components. The access control service 145 enforces a rule-based access control system for accessing the management platform 133, performing commands, and/or obtaining status information. The access control service 145 can authenticate administrative users with an approaches like OAUTH2, OPEN ID CONNECT, and so on. For example, the access control service 145 can support single sign-on. Different users can be granted different privileges, and some actions can be restricted to users having a heightened privilege level.

The logging service 148 can log actions taken using the management platform 133 such as actions taken through the services (e.g., management service 157, policy service 159, inventory service 161, etc.) offered by the management platform 133. The logging service 148 can also log operational status information relating to the managed network 107, such as operational status information for control plane services 118, data plane services 115, and the network hosts 112. The logging service 148 can provide for retrieval of logging information for authenticated users.

The resiliency service 151 can be executed to assure that the various components of the management platform 133 are operating. If a component is crashed, stalled, or otherwise nonresponsive, the resiliency service 151 can cause that component to be restarted.

The data storage service 154 facilitates data storage in and data retrieval from the data store 121. For example, the data storage service 154 can support key-value pair storage, such that a data value is stored and retrieved using a key that is an index.

The management service 157 receives commands from authenticated users and in response to those commands effects configuration changes to the managed network 107. To this end, the management service 157 can communicate with the control plane services 118 and/or other services on the managed network 107 to make changes to their configurations. The communication can be accomplished in some cases using a network tunnel over the network 109 to reach a proxy 119 on the managed network 107, where the control network traffic originates through the proxy 119 on the managed network 107. The management service 157 can generate various user interfaces, such as dashboards, to report operational status information relating to the managed network 107 and allow the user to issue commands that, for example, allow for configuration of software-defined networking such as creating or modifying microsegments or configuring a distributed firewall.

Policy service 159, also referred to as a policy manager, provides a graphical user interface (GUI) and application programming interfaces (APIs) to client devices 106 to allow the users (e.g., administrators) of such devices to specify their intent with respect to networking, security, and availability configurations of managed network 107. Once the user inputs the user-intent, the policy service 159 then configures management service 157 to realize the user-intent. In certain embodiments, policy service 150 also provides a set of one or more APIs to provide information relating to actions taken by policy service 150, to client devices 106 and third party solutions 174. Actions taken by policy service 150 may include, for example, receiving user-intent updates and configuring management service 157 with the updates.

Inventory service 161 provides information about the various entities in networked environment 100. For example, inventory service 161 provides information about virtual machines, containers, hypervisors, hosts, etc., in computing environment 103 as well as managed network 107. In certain embodiments, inventory service 161 also provides a set of one or more APIs to provide information about these virtual machines, containers, hypervisors, hosts, etc., as well as actions taken by inventory service 161, to client devices 106 and third party solutions 174.

It is noted that the computing environment 103 can have a multi-tenant architecture and various services, e.g., the API gateway 139, load balancer 136, etc., can be shared among multiple instances of the management platform 133 corresponding to different customers of managed network 107. In one example, managed network 107 may itself be multi-tenant such that different users or sub-organizations within the entity that controls or operates managed network 107 may have sole privileges to create or manage particular logical overlay networks or network segments, and workloads thereon, within managed network 107

The data stored in the data store 121 includes, for example, access control rules 160, logging data 163, network configuration data 166, among other data. The access control rules 160 indicate to which operations or interfaces particular users will have access. The access control rules 160 can include security credentials or other rules that control authentication (e.g., geofences). The logging data 163 corresponds to data generated by the logging service 148 and/or other services configured to record their operational data to the data store 121. The network configuration data 166 corresponds to the current, previous, and/or future configurations of the managed network 107, which can include configuration for software-defined networking such as microsegments and distributed firewalls.

The client device 106 is representative of a plurality of client devices 106 that can be coupled to the network 109. The client device 106 can comprise, for example, a processor-based system such as a computer system. The client device 106 can include a display 169.

The client device 106 can be configured to execute a client application 172 for communicating with the computing environment 103 to manage the managed network 107. The client application 172 can render a user interface 175 on the display 169. In one implementation, the client application 172 is a special-purpose application for interacting with the management platform 133, and the client application 172 can render user interfaces with data obtained through the API gateway 139 and then send data entered by a user to the API gateway 139. In another implementation, the client application 172 is a browser application that renders network pages, such as web pages, generated by the management service 157.

Third party solutions 174 may be used to provide various services to managed network 107 and/or supplement the services provided by the management platform 133. For example, a third party solution 174 may provide network security services to managed network 107. In that example, in order to provide such services, the third party solution 174 may require access to operational and configuration information associated with managed network 107. The operational and configuration information may be, at least in part, generated as a result of actions taken using the management platform 133. In another example, a third party solution 174 may provide network insight and analytics for software-defined networking and security. In such an example, the third party solution 174 may require access to a similar type of data, including operational and configuration information.

Figure 2:
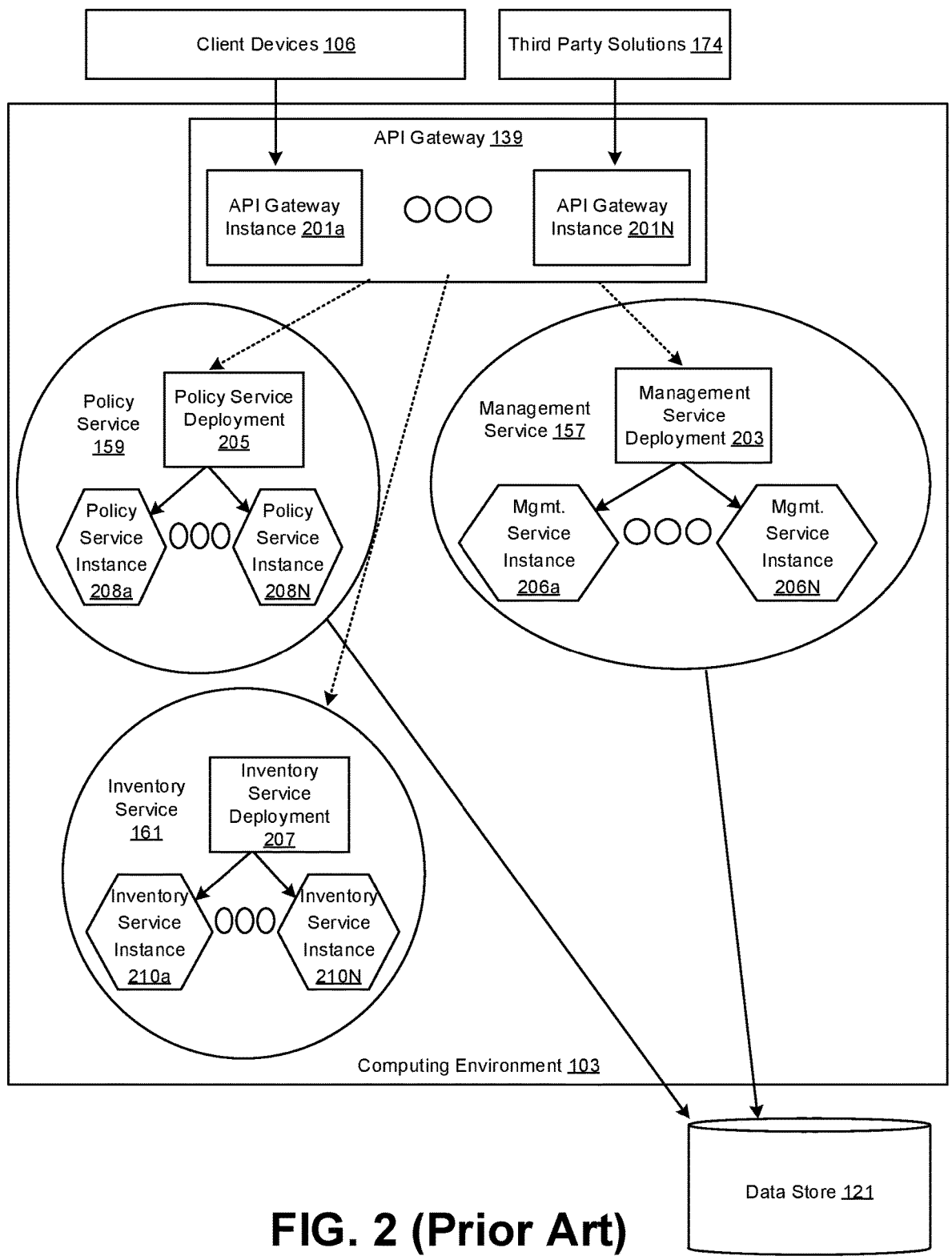
FIG. 2 is a diagram illustrating an example relationship among components in the networked environment of FIG. 1.

Moving on to FIG. 2, shown is a prior art diagram illustrating an example relationship among components in the networked environment 100 (FIG. 1). The client devices 106 and third party solutions 174 communicate with the API gateway 139 in the computing environment 103, which can include a plurality of API gateway instances 201a ... 201N that can be load balanced. An API gateway instance 201 routes a command or query from a client device 106 or a third party solution 174 to a service, such as management service 157, policy service 159, inventory service 161, etc., within the computing environment 103. The command or query is routed to a specific deployment of multiple potential deployments of the corresponding service, if the computing environment 103 is multi-tenant.

For example, a command or query directed to management service 157 is routed to management service deployment 203, which is associated with a certain tenant. The management service deployment 203 then routes the command or query to one or more management service instance 206a ... 206N. The management service instances 206 can communicate with the data store 121. A management service instance 206 may execute in the form of a pod, which refers to a unit of deployment or an instance of an application or service; in this case, management service 157. A pod may comprise a single container or multiple containers that collectively perform the corresponding service. Generally, in cases where the pod comprises multiple containers, the multiple containers include an application or main container and one or more utility or sidecar containers. The main container is generally configured to perform the main functionality of the corresponding service for which the pod is deployed. A sidecar container's job is to support the main container in the pod. In some embodiments, all containers within a pod are configured to share the same host's network and storage stack. Also, in some embodiments, each a pod is assigned a virtual IP address, which is used by any entity outside the pod to communicate with the pod, or any containers therein.

In the example of FIG. 2, management service instance 206a executes in the form of a pod that comprises a management service container (not shown), a log agent container (not shown), etc. The management service container, in such an example, is the main container that receives commands from authenticated users of the corresponding tenant and in response to those commands effects configuration changes to the managed network 107. The log agent container is a sidecar that is responsible for performing logging services, such as logging any actions taken using the management service container into data store 121.

As updates are necessary or desired, the management service instances 206 can be updated without causing downtime. For example, an updated management service instance 206 can be rolled out alongside an existing management service instance 206. The existing management service instance 206 can then be removed. In another scenario, a duplicate computing environment 103 can be instantiated running alongside the existing computing environment 103. The updates can then be performed to the duplicate computing environment 103. Once the updates are finished and the system is stable, the incoming requests can be switched over to the new computing environment 103. This approach offers the ability to roll back to the previous computing environment 103 if something goes wrong in the duplicate computing environment 103.

Similar to management service 157, a command or query directed to policy service 159 may be routed to policy service deployment 205. The policy service deployment 205, which similarly belongs to a certain tenant, then routes the command or query to one or more policy service instances 208a ... 208N. A policy service instance 208 may also execute in the form of a pod that comprises a policy service container (PSC) (e.g., PSC 326 shown in FIG. 3) and a log agent container (LAC) (e.g., LAC 328 shown in FIG. 3). The policy service container receives intent of the corresponding tenant's users with respect to networking, security, and availability configurations of managed network 107. The log agent container logs the user intent, any changes in the user-intent, and/or actions taken by the policy service container.

Inventory service 161 operates similar to management service 157 and policy service 159 and, therefore, the details of inventory service deployment 207 and inventory service instances 210 are not described for brevity. Note that, although not shown, additional services within computing environment 103 and/or managed network 107, such as any of the services shown in FIG. 1, are deployed similar to the deployments of management service 157, policy service 159, and inventory service 161.

As described above, management service 157, policy service 159, inventory service 161, etc., expose their APIs to third party solutions 174 through API gateway 139. Generally, a third party solution 174 that, for example, provides monitoring services may be configured to periodically, e.g., every 5 or 10 minutes, generate a query or command (also referred to as polling) directed to these services to retrieve information relating to changes or updates in network operations and configurations, including, for examples, changes in policies, firewall rules, additions or removal of virtual machines, containers, etc. These queries and commands are received at API gateway 139 and then forwarded to the intended recipient, such as one of the service deployments. However, in certain cases, allowing a number of third party solutions 174 to frequently poll these services may overload API gateway 139 and the services or at least place a large burden thereon. In certain cases, a third party solution 174 may keep polling a service every, for example, 5 minutes during a 30-minute period, while there has been no changes or updates during that period. In such cases, the third party solution 174 is unnecessarily placing a burden on the entire system by continuing to poll the services.

Also, in some cases, a third party solution 174 may need to be made aware of changes relating to the services in management platform 133 in real time. In such cases, polling these services in 5-minute intervals may result in the third party solution 174 not being made aware of certain changes for 5 minutes, which may not be desirable. Another reason why the use of APIs for communications between third party solutions 174 and the services described above may not be optimal is that, generally, when the each of these services undergoes an update (e.g., a change in the underlying instructions), the APIs provided by such services may also need to be changed so that the third party solutions 174 can continue to communicate with, for example, the changed functionality of the services. However, changing the APIs associated with a service, every time the service undergoes a change may not be optimal.

Note that a third party solution that provides monitoring services is only one example of a third party solution. Other examples may include "service-insertion" third party solutions that are configured to provide a service to the users of client devices 106. In one example, such services may include providing users with access to a console to provide security-related information to the users (e.g., issuing security alerts) or to allow users to input user configurations relating to network security. Providing such services over the network and also through APIs, however, may not be optimal because of the resulting latency and also the load that is placed on the network.

Accordingly, the embodiments described herein relate to enabling a third party solution to execute a sidecar container, referred to as an adapter, within a service instance (e.g., policy service instance 208a) of a service deployment (e.g., policy service deployment 205). In other words, by using the adapter, the third party solution is able to integrate with the service deployment. The adapter can be configured to obtain updates and changes (collectively referred to hereinafter as updates) being made by the main container (e.g., policy service container 326) relating to the corresponding service (e.g., policy service 159). In certain embodiments, the adapter is configured to receive push notifications from a data store or a container within the service instance (e.g., the main container) relating to any updates. In some other embodiments, in addition to or instead of receiving push notifications, the adapter may be configured to directly poll the main container for information. In some embodiments, the adapter may poll the main container, for example, through the main container's API(s) directly or instead through API gateway 139.

In embodiments where the third party solution is a service-insertion solution, the adapter may be configured to provide a service that executes within the adapter, instead of executing the service at an endpoint outside computing environment 103, such as an endpoint hosted by the third party solution that communicates with computing environment 103 through API gateway 139.

Figure 2A:
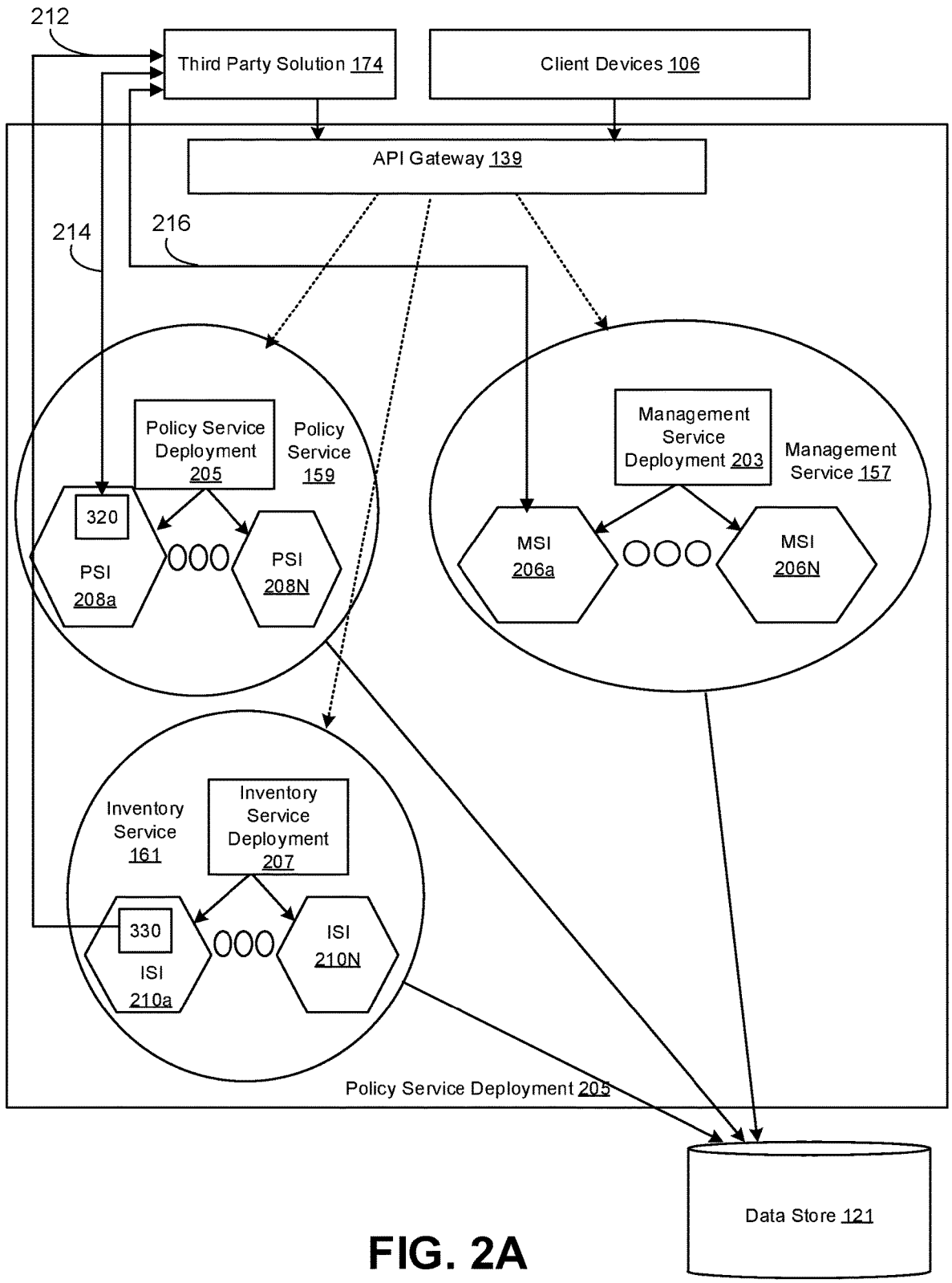
FIG. 2A is a diagram illustrating an example of a third party solution establishing direct communications with service instances through adapters, according to some embodiments.

FIG. 2A illustrates an example of a third party solution 174 establishing direct communications 214 with policy service instance 208a through an adapter 320 (e.g., described with respect to FIG. 3) that is instantiated as part of policy service instance 208a, direct communications 212 with inventory service instance 210a through an adapter 330 (e.g., described with respect to FIG. 3) that is instantiated as part of inventory service instance 210a, and direct communications 216 with management service instance 206a through an adapter (not shown) that is instantiated as part of management service instance 206a. In the embodiments of FIG. 2A, direct communications refer to communications that do not pass through API gateway 139. The details of how the third party solution 174 of FIG. 2A directly communicates with these service instances through the use of adapters is discussed with respect to FIG. 4. Note that, in certain embodiments, the third party solution 174 of FIG. 2A may still be able to communicate with any of the service instances through API gateway 139 in addition to the direct communication it is able to establish with such service instances through the use of adapters.

Figure 3:
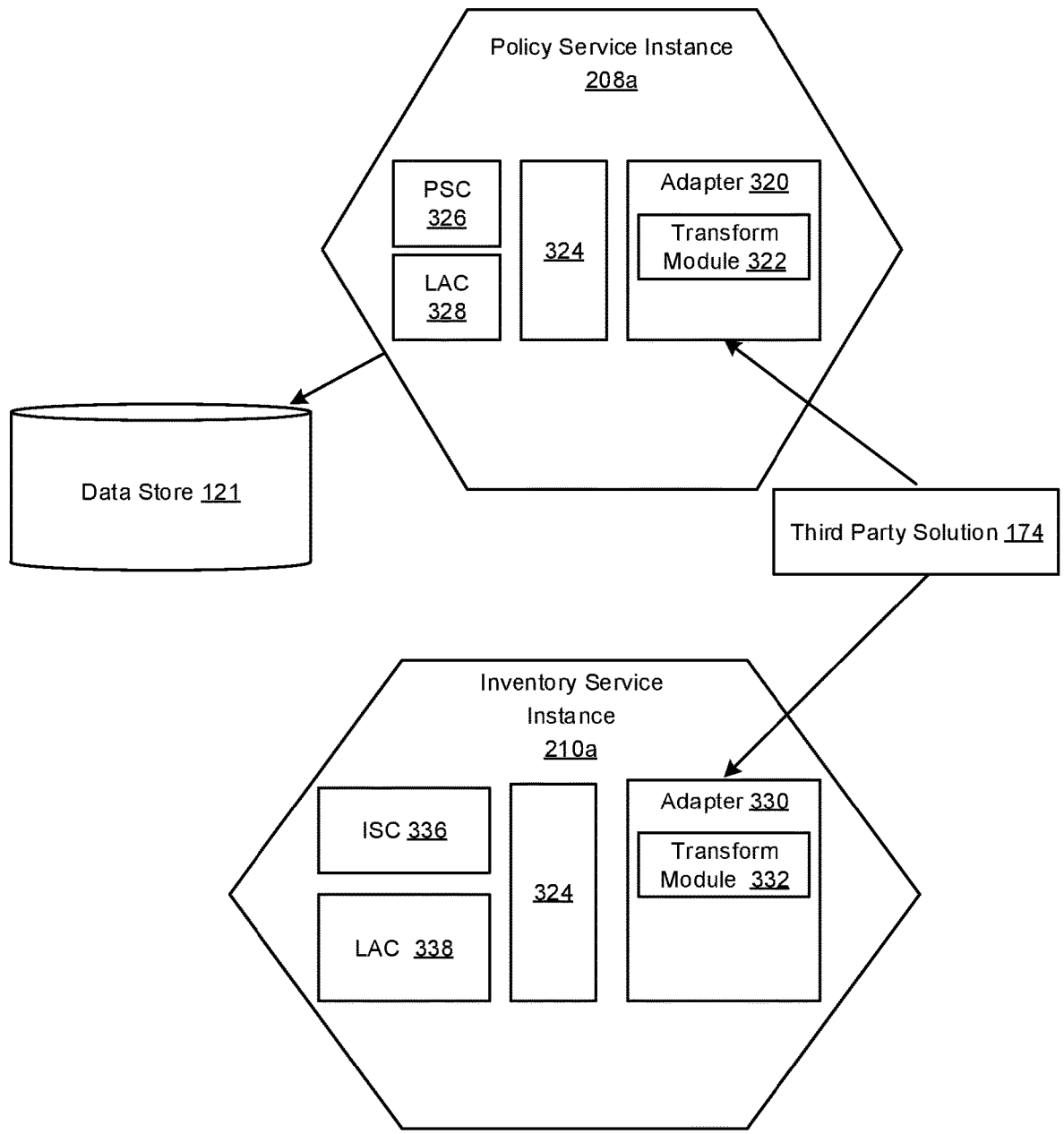
FIG. 3 is a diagram illustrating example adapter containers (hereinafter referred to as adapters) integrated into some of the service instances of FIG. 2, according to some embodiments.

FIG. 3 illustrates an example of a policy service instance 208a and an inventory instance 210a, each executing in the form of a pod that includes an adapter associated with a third party solution 174. For example, policy service instance 208a includes an adapter 320, a PSC 326, a LAC 328, as well as an abstraction layer 324. When policy service instance 208a is being deployed, the corresponding service definition (e.g., the service definition of policy service 159) recognizes multiple sidecar containers that can also be instantiated alongside PSC 326. The service definition, in one example, is a YAML file (a recursive acronym for "YAML Ain't Markup Language"). In this example, the service definition for policy service 159 recognizes adapter 320 as one of the possible sidecars that can be deployed within policy service instance 208a. As such, when a user, such an as admin, of client devices 106 is deploying or instantiating policy service instance 208a, the user is able to instantiate adapter 320 as a sidecar container. The other sidecar container is LAC 328, which performs logging services, such as logging actions (e.g., updates) taken by PSC 326 into data store 121. Abstraction layer 324 refers to a set of instructions that provide an interface for any adapter with any business logic to integrate into policy service instance 208a and communicate with other containers inside policy service instance 208s and/or outside entities, such as data store 121.

To instantiate adapter 320 a container image is retrieved by container runtime 130, the container image being a self-contained piece of software with all the components it needs to execute. In this example, the container image comprises business logic or instructions, which may be written by the third party solution 174 to enable adapter 320 to perform its intended function. The function may include obtaining information relating to any action performed by PSC 326, providing a user interface or console to users of client devices 106, etc. As part of the business logic of adapter 320, a set of instructions may also be provided for transforming the information obtained by adapter 320 into a format or language that is desired and understandable by the third party solution 174. Transform module 322 within adapter 320 is representative of such instructions.

As an example, the third party solution 174 may be a monitoring service, in which case, adapter 320 may execute business logic that allows adapter 320 to register with data store 121 through an abstraction layer 324. For example, adapter 320 may call a function provided by abstraction layer 324 to register with data store 121 in order to have the data store 121 notify adapter 320 of all the updates LAC 328 is making to data store 121 as a result of PSC 326's actions. For example, data store 121 may include a transaction log that is a sequential record of all changes made to data store 121 by LAC 328. If adapter 320 has registered with data store 121, then data store 121 sends information relating to the latest transaction log entries to the adapter 320 to inform the third party solution 174 of the latest updates. The mechanism by which adapter 320 communicates with third party solution 174 is discussed with respect to FIG. 4.

For example, in some embodiments, data store 121 is configured to examine or "listen" to the transaction log, identify the latest updates, retrieve information associated with such updates from the corresponding transaction log entries, and send the information in a certain format, such as in protocol buffer messages, to adapter 320 through abstraction layer 324. At adapter 320, the transform module 322 may then take the protocol buffer messages as input and subsequently output the information in the messages in a format and language that are desired and understandable by third party solution 174. In another example, instead of converting the information that is retrieved from the transaction log into a certain format, data store 121 may provide the information to adapter 320 in a raw or untouched manner.

Note that registering with data store 121 is only one example of how adapter 320 can obtain information. In certain other embodiments, adapter 320 may register with another container within a pod. For example, in the case of policy service instance 208*a*, adapter 320 may register with PSC 326 to obtain information. In embodiments where an adapter registers with a container, the container may be similarly configured to convert the information, that is about to be sent to the adapter, into a certain format or just send the information in a raw format.

In the example of FIG. 3, in addition to or instead of providing adapter 320 with the latest updates in the form of "push notifications," in certain embodiments, adapter 320 may be configured to poll any of the containers within policy service instance 280*a*. For example, adapter 320 may poll the API(s) of a container within policy service instance 280*a* either directly or through API gateway 139. Configuring adapter 320 of a third party solution 174 to poll the APIs of containers is still more optimal than the third party solution 174 polling the APIs using an endpoint outside of computing environment 103. This is because the amount of information that may be generally available through over-the-network APIs may be more limited than the amount of information that may be made available to a component, such as adapter 320, within policy service instance 208*a*.

FIG. 3 also illustrates inventory service instance 210*a* that runs on inventory service container (ISC) 336, LAC 338, and adapter 330. The integration of adapter 330 into inventory service instance 210*s* is similar to the integration of adapter 320 into policy service instance 208 and, therefore, is not further described for brevity. Adapter 330 may belong to the same third party solution 174 or a different one. Also, adapter 330 may comprise the same business logic or different business logic. Adapter 330 also includes transform module 332, which functions in a similar manner as transform module 332. Note that although FIG. 3 only shows adapters within policy service instance 208*a* and inventory service instance 210*a*, third party solutions 174 may also integrate with other services through the use of adapters. For example, an adapter of a third party solution 174 may be deployed in a pod associated with any of the services in management platform 133 (e.g., management service 157) or managed network 107 (e.g., control plane services 118).

Figure 4:
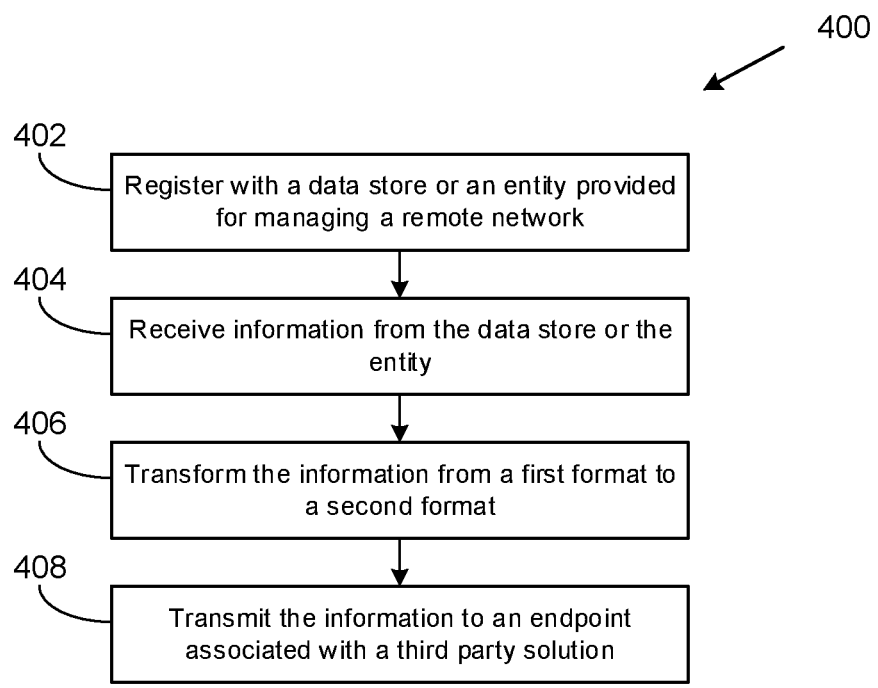
FIG. 4 is a flowchart illustrating an example of a third party solution receiving information through an adapter that is implemented in the networked environment of FIG. 1, according to various examples of the present disclosure.

FIG. 4 shows a flowchart that provides an example of the operation of an adapter. Operations 400 of FIG. 4 are described herein with reference to FIGS. 1-3 and their components.

At step 402, an adapter registers with a data store or an entity within a software-defined networking environment provided for managing a remote network. For example, adapter 320 registers with data store 121 or PSC 326, each of which is provided by management platform 133 for managing managed network 107. As described above, the entity may be a container within the same service instance. The registration causes data store 121 or PSC 326 to send information (e.g., operational status, configuration information, updates, etc.) associated with policy service instance 208*a* as a result of actions taken by PSC 326 to the adapter 320. In one example, data store 121 or PSC 326 send real-time updates to adapter 320 as the updates become available.

At step 404, the adapter receives information from the data store or entity. For example, adapter 320 receives information from data store 121 through abstraction layer 324. In such an example, the information relates to the operations of PSC 326, such as updates made by PSC 326. As described previously, the information is retrieved from new or updated entries in a transaction log of the data store 121. In another example, adapter 320 receives information from PSC 326.

At step 406, the adapter transforms the information from a first format to a second format. For example, adapter 320 receives information in protocol buffer messages and may reformat the information by using another method of format of serializing data.

At step 408, the adapter transmits the information to an endpoint associated with a third party solution. For example, adapter 320 transmits the information received from data store 121 to the corresponding third party solution 174 over, e.g., network 109. In one example, adapter 320 transmits the information to the corresponding third party solution 174 without using API gateway 139. For example, adapter 320 transmits the information as one or more packets to the corresponding third party solution 174 through the underlying host 103 running adapter 320's physical network interface card (PNIC). In such an example, the source IP address in the packet may be that of the underlying host 103 and associated with the PNIC. Further, the destination IP address in the packet may be that of the device running the third party solution 174. Accordingly, the packet is routed over the network, such as network 109 shown in FIG. 1, from host 103 to the third party solution 174. In another example, adapter 320 transmits the information to the corresponding third party solution 174 through API gateway 139, such as shown and described with respect to FIGS. 2 and 2A.

The flowchart of FIG. 4 shows an example of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowchart of FIG. 4 shows a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the sequence diagrams can be skipped or omitted. In addition, any number of counters, state variables, warning semaphores, or messages could be added to the logical flow described herein, for purposes of enhanced utility, accounting, performance measurement, or troubleshooting aid. It is understood that all of these variations are within the scope of the present disclosure.

The individual components of the computing environment 103, the client device 106, the managed network 107, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management platform 133 and other components described herein, can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (for example, field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, or flash memory. Further, any logic or component described herein can be implemented and structured in a variety of ways. One or more components described can be implemented as modules or components of a single application. Further, one or more components described herein can be executed in one computing device or by using multiple computing devices.

The above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

Therefore, the following is claimed:

1. A system for management of a network, comprising:
a computing device comprising a processor and a memory; and
machine readable instructions stored in the memory that, when executed by the processor, cause the computing device to perform a method comprising:
instantiating an adapter container and a main container within a service instance of a service deployment associated with a service that performs operations related to management of the network, wherein:
the adapter container and the main container share a network stack and a storage stack of a host computer;
the adapter container was generated based on information provided by a third party solution;
the adapter container is configured to communicate with an endpoint associated with the third party solution that is external to the host computer; and
the main container was not generated based on any information provided by the third party solution;
registering, at the adapter container, with one of:
the main container; or
a data store associated with the main container;
based on the registering, receiving, at the adapter container, information associated with the service instance from the data store or the main container, wherein the registering causes the data store or the main container to send, within the host computer, the information associated with the service instance to the adapter container when the information associated with the service instance is available;
transforming, at the adapter container, the information associated with the service instance from a first format to a second format; and
transmitting, at the adapter container, the information associated with the service instance via one or more network packets from the host computer to the endpoint.

2. The system of claim 1, wherein:
the service instance comprises a pod comprising a plurality of containers including at least the main container and one or more sidecar containers,
the one or more sidecar containers include the adapter container.

3. The system of claim 1, wherein the adapter container communicates with the data store or the main container through an abstraction layer.

4. The system of claim 1, wherein receiving the information comprises receiving the information in one or more push notifications.

5. The system of claim 1, wherein receiving the information comprises receiving the information in response to the adapter container polling the data store or the main container.

6. The system of claim 5, wherein the polling is performed through one or more application programming interfaces of the data store or the main container.

7. The system of claim 1, wherein receiving the information comprises receiving the information in one or more protocol buffer messages, and wherein the first format corresponds to the protocol buffer messages.

8. A method for managing a network, comprising:
instantiating an adapter container and a main container within a service instance of a service deployment associated with a service that performs operations related to management of the network, wherein:
the adapter container and the main container share a network stack and a storage stack of a host computer;
the adapter container was generated based on information provided by a third party solution;
the adapter container is configured to communicate with an endpoint associated with the third party solution that is external to the host computer; and
the main container was not generated based on any information provided by the third party solution;
registering, at the adapter container, with one of:
the main container; or
a data store associated with the main container;
based on the registering, receiving, at the adapter container, information associated with the service instance from the data store or the main container, wherein the registering causes the data store or the main container to send, within the host computer, the information associated with the service instance to the adapter container when the information associated with the service instance is available;
transforming, at the adapter container, the information associated with the service instance from a first format to a second format; and transmitting, at the adapter container, the information associated with the service instance via one or more network packets from the host computer to the endpoint.

9. The method of claim 8, wherein:

the service instance comprises a pod comprising a plurality of containers including at least the main container and one or more sidecar containers, the one or more sidecar containers include the adapter container.

10. The method of claim 8, wherein the adapter container communicates with the data store or the main container through an abstraction layer.

11. The method of claim 8, wherein receiving the information comprises receiving the information in one or more push notifications.

12. The method of claim 8, wherein receiving the information comprises receiving the information in response to the adapter container polling the data store or the main container.

13. The method of claim 12, wherein the polling is performed through one or more application programming interfaces of the data store or the main container.

14. The method of claim 8, wherein receiving the information comprises receiving the information in one or more protocol buffer messages, and wherein the first format corresponds to the protocol buffer messages.

15. A non-transitory computer readable medium having instructions stored thereon that, when executed by a computer system, cause the computer system to perform a method for managing a network, the method comprising:

instantiating an adapter container and a main container within a service instance of a service deployment associated with a service that performs operations related to management of the network, wherein:

the adapter container and the main container share a network stack and a storage stack of a host computer;

the adapter container was generated based on information provided by a third party solution;

the adapter container is configured to communicate with an endpoint associated with the third party solution that is external to the host computer; and the main container was not generated based on any information provided by the third party solution;

registering, at the adapter container, with one of:
the main container; or
a data store associated with the main container;

based on the registering, receiving, at the adapter container, information associated with the service instance from the data store or the main container, wherein the registering causes the data store or the main container to send, within the host computer, the information associated with the service instance to the adapter container when the information associated with the service instance is available;

transforming, at the adapter container, the information associated with the service instance from a first format to a second format; and transmitting, at the adapter container, the information associated with the service instance via one or more network packets from the host computer to the endpoint.

16. The non-transitory computer readable medium of claim 15, wherein:

the service instance comprises a pod comprising a plurality of containers including at least the main container and one or more sidecar containers, the one or more sidecar containers include the adapter container.

17. The non-transitory computer readable medium of claim 15, wherein the adapter container communicates with the data store or the main container through an abstraction layer.

18. The non-transitory computer readable medium of claim 15, wherein receiving the information comprises receiving the information in one or more push notifications.

19. The non-transitory computer readable medium of claim 15, wherein receiving the information comprises receiving the information in response to the adapter container polling the data store or the main container.

20. The non-transitory computer readable medium of claim 19, wherein the polling is performed through one or more application programming interfaces of the data store or the main container.

21. The non-transitory computer readable medium of claim 15, wherein receiving the information comprises receiving the information in one or more protocol buffer messages, and wherein the first format corresponds to the protocol buffer messages.

22. The system of claim 1, wherein the adapter container comprises logic that corresponds to the third party solution.

* * * * *